US012620858B2

(12) United States Patent
Ferrara et al.

(10) Patent No.: US 12,620,858 B2
(45) Date of Patent: May 5, 2026

(54) ELECTRIC MACHINE STATOR WITH FOLDABLE INSULATING ELEMENTS, AND METHOD FOR MANUFACTURING SUCH A STATOR

(71) Applicant: FERRARI S.P.A., Modena (IT)

(72) Inventors: Davide Ferrara, Modena (IT); Paolo Faverzani, Modena (IT); Luca Poggio, Modena (IT)

(73) Assignee: FERRARI S.P.A., Modena (IT)

( * ) Notice: Subject to any disclaimer, the term of this patent is extended or adjusted under 35 U.S.C. 154(b) by 182 days.

(21) Appl. No.: 18/462,989

(22) Filed: Sep. 7, 2023

(65) Prior Publication Data

US 2024/0088739 A1 Mar. 14, 2024

(30) Foreign Application Priority Data

Sep. 12, 2022 (IT) ........................ 102022000018504

(51) Int. Cl.
*H02K 3/52* (2006.01)

(52) U.S. Cl.
CPC ......... *H02K 3/522* (2013.01); *H02K 2203/12* (2013.01)

(58) Field of Classification Search
CPC ........................... H02K 3/522; H02K 2203/12
See application file for complete search history.

(56) References Cited

U.S. PATENT DOCUMENTS

2015/0256052 A1 9/2015 Yoshida et al.
2016/0248308 A1* 8/2016 Ogawa ..................... H02K 1/24

FOREIGN PATENT DOCUMENTS

| FR | 2995471 A1 * | 3/2014 | ............. H02K 3/522 |
| JP | 2003061286 A | 2/2003 | |
| JP | 2011259614 A | 12/2011 | |
| JP | 2016036223 A * | 3/2016 | |

OTHER PUBLICATIONS

Yamamoto (JP 2016036223 A) English Translation (Year: 2016).*
Jugovic (FR 2995471 A1) English Translation (Year: 2014).*
Italian Search Report for Application No. 102022000018504, Filing Date: Sep. 12, 2022; Date of Mailing: Apr. 28, 2023, 8 pages.

* cited by examiner

*Primary Examiner* — Tulsidas C Patel
*Assistant Examiner* — Robert E Mates
(74) *Attorney, Agent, or Firm* — CANTOR COLBURN LLP

(57) ABSTRACT

An electric machine stator has a core of ferromagnetic material, consisting of teeth arranged around a longitudinal axis and defining a plurality of slots; the stator has, for each tooth, an insulating cap fixed to a longitudinal end thereof via an interference coupling and provided with front projections, spaced apart from one another in a radial direction; the windings, which are made of electrically conductive material, extend in the half-slots on opposite sides of each tooth and around the cap, and radially between the front projections; each half-slot carries at least one sheet of foldable insulating material, which has a C-shaped portion, interposed between the first wire portions and the tooth, and at least one flap, longitudinally projecting from the C-shaped portion out of the corresponding half-slot and radially resting on an end portion of one of the front projections.

13 Claims, 5 Drawing Sheets

ELECTRIC MACHINE STATOR WITH FOLDABLE INSULATING ELEMENTS, AND METHOD FOR MANUFACTURING SUCH A STATOR

CROSS-REFERENCE TO RELATED APPLICATIONS

This patent application claims priority from Italian patent application no. 102022000018504 filed on Sep. 12, 2022, the entire disclosure of which is incorporated herein by reference.

TECHNICAL FIELD

The invention relates to an electric machine stator provided with insulation sheets arranged around the copper windings in order to insulate them from the iron core.

PRIOR ART

As it is known, an electric machine stator has an iron core, which can consist of a plurality of teeth, which define, in a circumferential direction, a series of stator slots between them. The copper windings, which extend in the slots around the teeth, must be electrically insulated from the adjacent windings and from the iron of the core.

In order to obtain this insulation, a folded sheet made of an insulating paper material, also known as "insulation paper", is used. In detail, at the slots, the side surfaces of each tooth are covered by respective strips of said insulation papers.

The insulation papers directly rest on the tooth and can be directly locked by the winding or they can be fixed by means of two insulating elements, also known as "caps", coupled to the opposite axial ends of the tooth in fixed positions.

At the same time, at the opposite axial ends of the tooth, the windings are arranged around the outer surfaces of the two caps, which, hence, serve as electrical insulation from the iron of the core.

In these known solutions, the position and the coupling modes of the insulation papers are scarcely satisfactory, since the caps must be relatively large-sized and have relatively wide tolerances in order to take into account the thickness of the papers to be locked against the respective teeth.

On the contrary, the dimensions and the tolerances of the caps should be reduced, even by a few tenths of millimetre, in order to limit the overall size of the caps and make better use of this reduction in size to increase the space available for copper windings, to the full advantage of the efficiency of the electric machine.

Furthermore, in known solutions, the operations to be carried out to couple the caps to the axial ends of the teeth must be performed with particular care, in order to prevent the insulation paper from moving relative to the designed position, maybe even creasing and breaking, with consequent possible faults in the insulation of the windings.

Therefore, because of these problems, the ways in which the insulation papers and the caps are positioned and/or coupled relative to the teeth should be changed and/or simplified.

JP2016036223 discloses plastic material caps arranged on the axial ends of the teeth. Each one of the caps has a pair of axial projections, which radially face part of the tooth so as to define respective slits, which are engaged by an edge of the insulation paper.

SUMMARY OF THE INVENTION

The object of the invention is to provide an electric machine stator capable of solving the drawbacks discussed above in a simple and economic fashion.

According to the present invention, there is provided an electric machine stator as claimed in claim 1.

Preferred embodiments of the invention are defined in the appended dependent claims.

BRIEF DESCRIPTION OF THE DRAWINGS

The invention will now be described with reference to the accompanying drawings showing a non-limiting embodiment, wherein.

DETAILED DESCRIPTION OF PREFERRED EMBODIMENTS OF THE INVENTION

Figure 1:
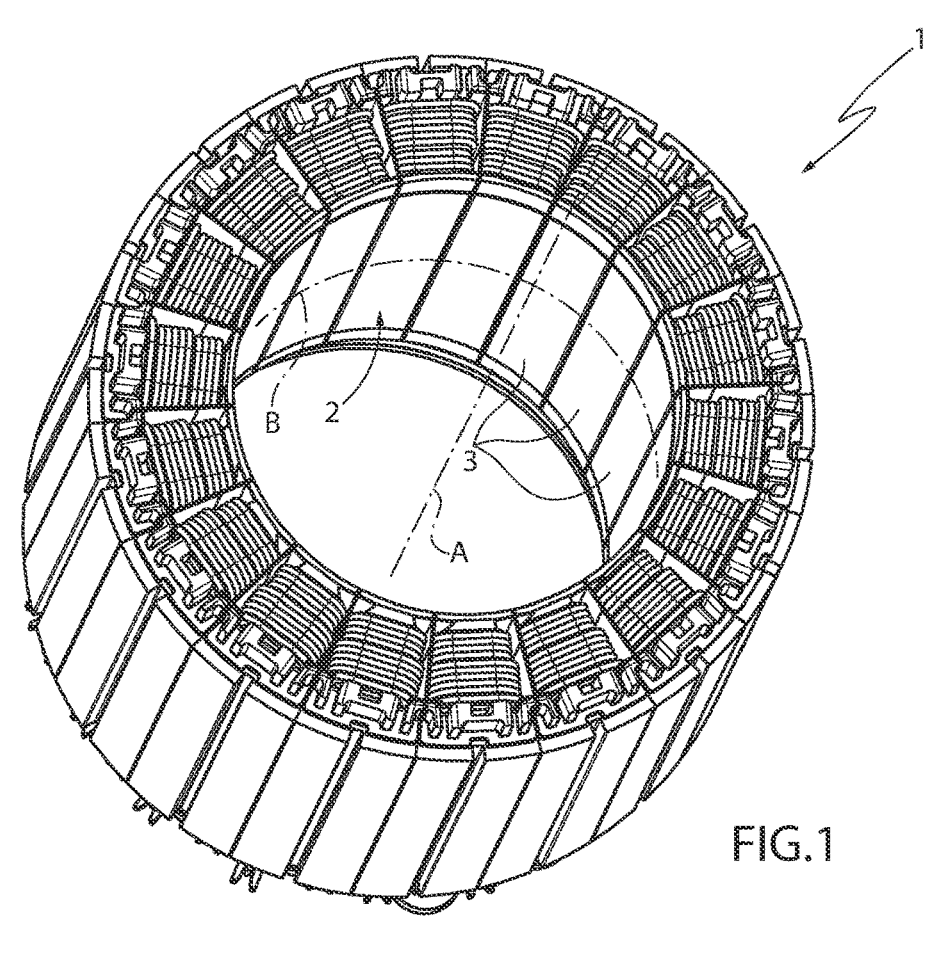
FIG. 1 is a perspective view of a preferred embodiment of the electric machine stator according to the invention.

In FIG. 1, reference number 1 indicates a stator of an electric machine suited to be used as motor-generator for driving motor vehicles. Anyway, it can be used as generator and/or in other applications.

Figure 2:
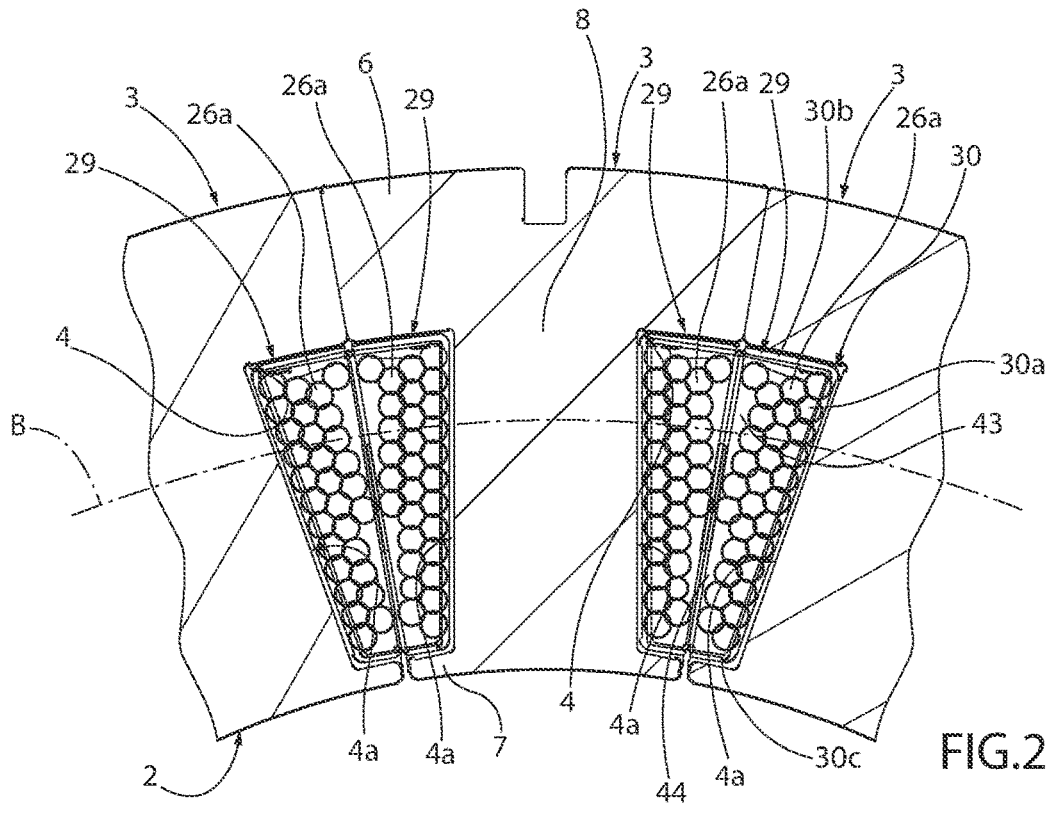
FIG. 2 shows part of the stator in a cross section.

The stator 1 extends along a longitudinal axis A and comprises a core 2 made of a ferromagnetic material, for instance iron. The core 2 consists of a plurality of teeth 3, which are arranged next to one another, with continuity, along a circumferential direction B around the axis A and, as shown in FIG. 2, define a series of slots 4 between them, along said direction B. The slots 4 and the teeth 3 extend parallel to the axis A and have respective cross sections with a constant area and shape along the axis A.

Therefore, each tooth 3 defines two half-slots 4a, which are parallel to one another along the direction B, and comprises: a radially outer portion 6, a radially inner portion 7 and an intermediate portion 8, which is narrower along the direction B. In particular, along the direction B, the portions 7 are spaced apart from one another by means of small slits parallel to the axis A.

Figure 5:
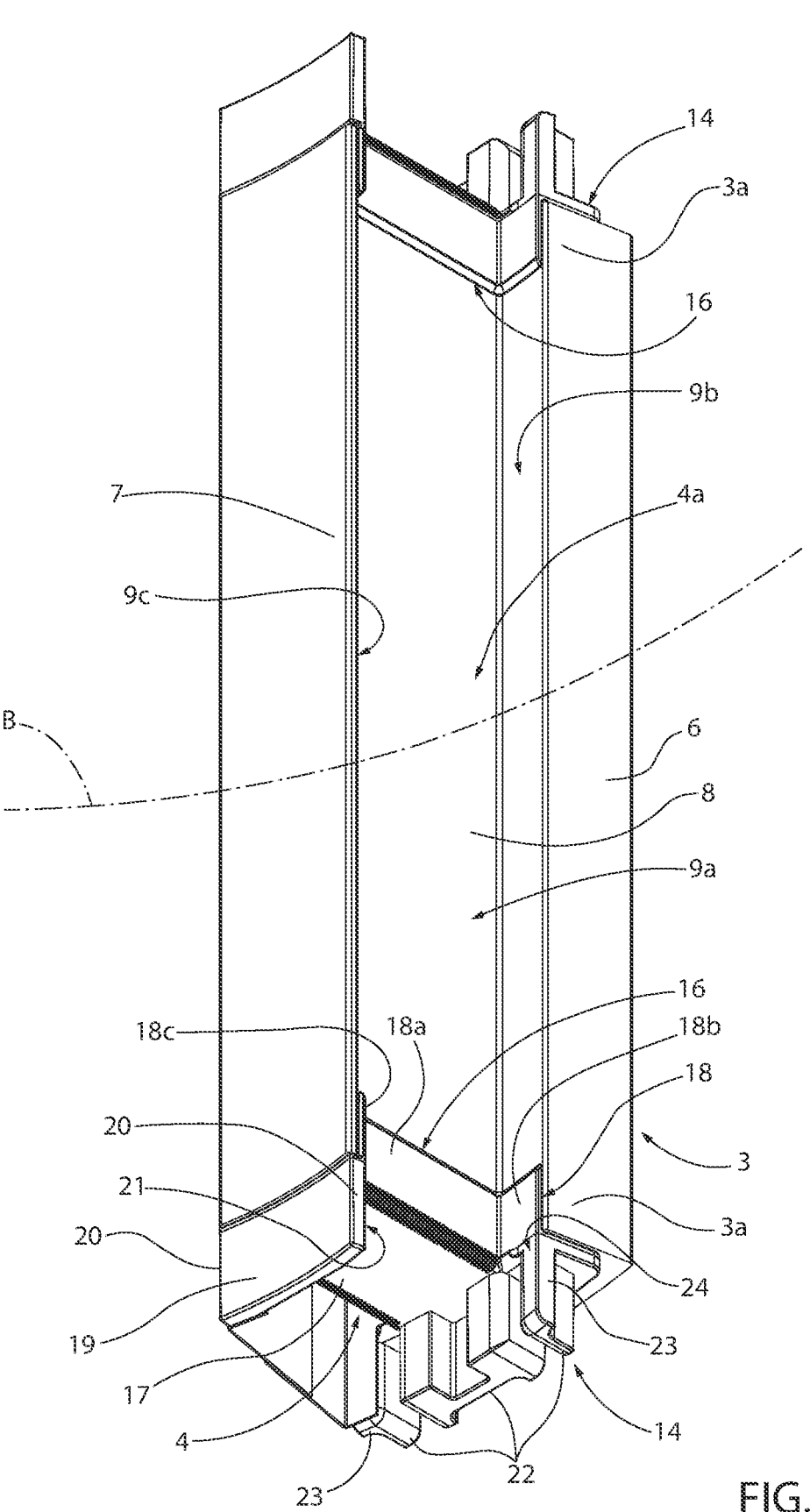

With reference to FIG. 5, each half-slot 4a is defined by a side surface, which, in this specific case, consists of a face 9a along the portion 8, a face 9b along the portion 6 and a face 9c along the portion 7. The faces 9b and 9c are transverse to the face 9a and are joined to the latter. In particular, the faces 9a lie on radial planes. Generally speaking, the cross section of the slots 4a can have a shape other than the one of the example shown herein.

The opposite axial ends of the teeth 3 are indicated by reference numbers 3a and are coupled to respective insulating elements, for example made of a plastic material, generally known as "caps" and indicated by reference number 14. Each cap 14 has an attachment portion 16 fitted on the corresponding end 3a in a fixed position by means of an interference coupling (so that it is secured to the teeth 3 by the deformation of the plastic material), preferably by means of a manual operation. More in detail, the coupling is obtained by axially inserting the end 3*a* into the attachment portion 16, like a male-female coupling.

Each cap 14 further comprises a covering portion 17 longitudinally resting against a head surface of the tooth 3 (which, in turn, is orthogonal to the axis A). The attachment portion 16, in particular, consists of two connecting walls 18, which longitudinally project from the covering portion 17 into the half-slots 4*a*, namely on opposite sides of the tooth 3.

In particular, the connecting walls 18 are shaped with the same profile as the side surface of the half-slots 4*a*, namely they are C-shaped; more in particular, each wall 18 consists of an intermediate rib 18*a* and of two wings or flanges 18*b* and 18*c*, which project from the edges of the rib 18*a*: the rib 18*a* and the flanges 18*b* and 18*c* are in contact with the faces 9*a*, 9*b* and 9*c*, respectively.

The covering portion 17 carries a plurality of front projections, on the longitudinal side opposite the tooth 3. One of said projections is radially inner and is defined, in particular, by a plate 19 longitudinally aligned with the portion 7 of the tooth 3. The other projections are radially outer and are defined by appendages 22, which are longitudinally aligned with the portion 6 of the tooth 3 and are radially spaced apart from the plate 19.

The plate 19 ends, along the direction B, with two side portions 20 opposite one another. Basically, the portions 20 also are the extensions of the flanges 18*c* in a longitudinal direction; in other words, each flange 18*c* and the corresponding side portion 20 of the plate 19 define, together, a face 21 radially facing outwards.

Similarly, the appendages 22 comprise two side portions 23, which are opposite one another along the direction B and define respective extensions of the flanges 18*b* in a longitudinal direction; basically, each flange 18*b* and the corresponding side portion 23 of the appendages 22 define, together, a face 24 radially facing inwards.

Figure 8:
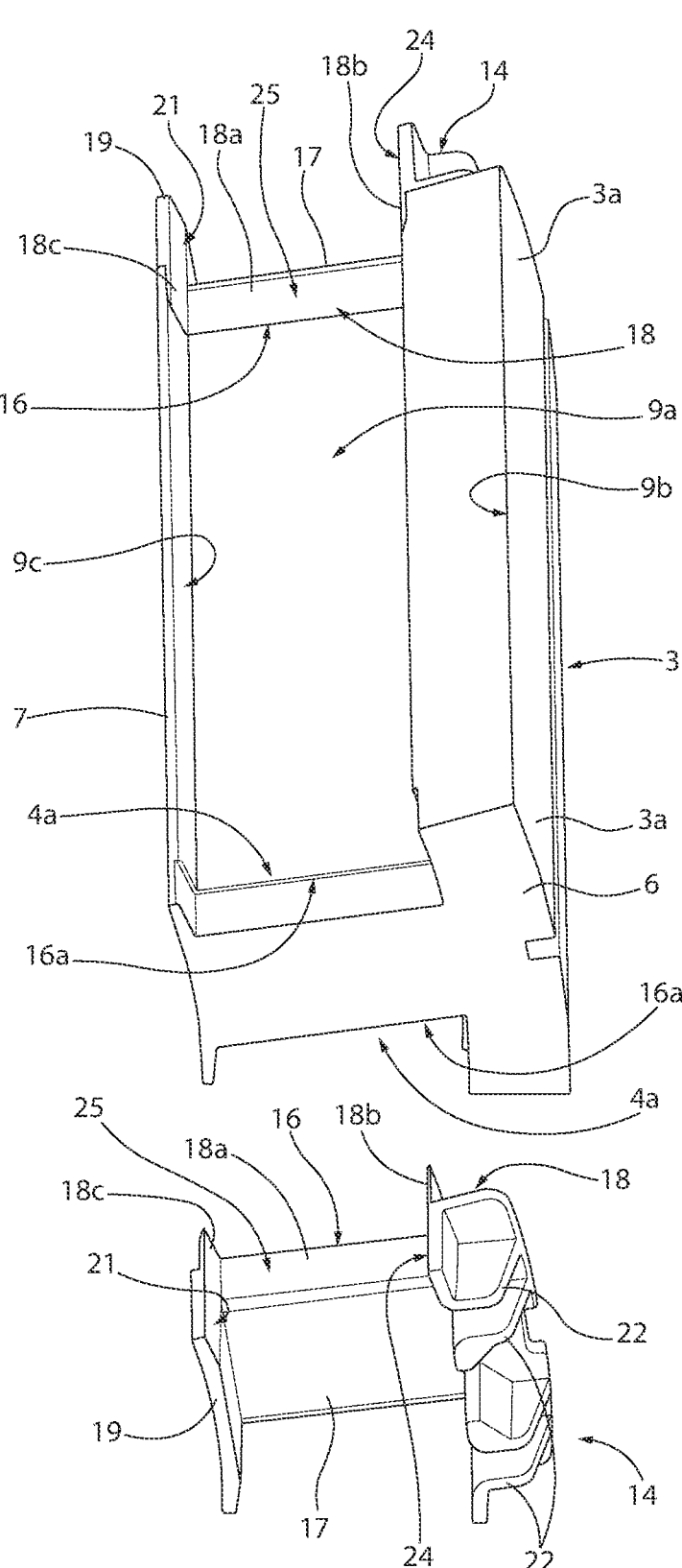
FIG. 8 is similar to FIG. 5 and shows a variant of the invention, with an exploded view.

Taking into account the preferred variant shown in FIG. 8, at the half-slots 4*a*, the outer surface of the ends 3*a* defines recesses 16*a* accommodating the attachment portions 16, so that they can be enclosed in the ends 3*a* (and, hence, do not project relative to the faces 9*a*, 9*b*, 9*c* in the half-slots 4*a*). In particular, each connecting wall 18 engages a respective recess 16*a*.

In other words, the faces 9*a*, 9*b* and 9*c* end with a step or level difference, at each end 3*a*, so as to define the aforesaid recesses 16*a*; therefore, in cross section, the ends 3*a* have smaller dimensions that the remaining part, namely the central part of the tooth 3, despite substantially having the same shape.

Preferably, the depth of the recesses 16*a* is equal to the thickness of the connecting walls 18, so that the faces 21 and 24 are flush with the faces 9*c* and 9*b* of the tooth 3, and the intermediate rib 18*a* of each connecting wall 18 has an outer face 25 flush with the face 9*a* of the tooth 3.

Figure 4:
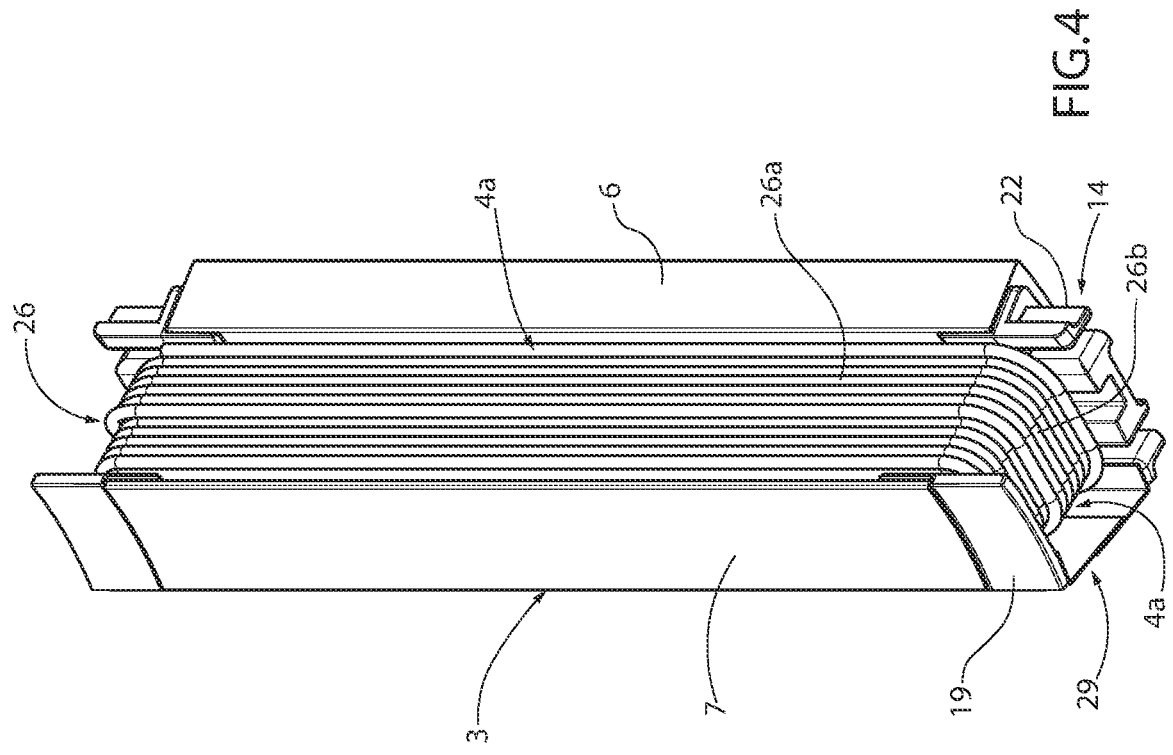
FIGS. 4 and 5 show the detail of FIG. 2, with parts removed for greater clarity.

With reference to FIG. 4, the stator 1 further comprises a plurality of windings 26 made of an electrically conductive material, for example copper, and wound around the portions 8 of the teeth 3. The windings 26 comprise wire portions 26*a*, which are straight and extend in the half-slots 4*a*, and wire portions 26*b*, which are curved and extend around the covering portions 17 of the caps 14, in the space radially available between the plate 19 and the appendages 22.

The wire portions 26*a* are wound in sheets 29 of foldable insulating material, generally paper material (also known as "insulation papers"), so as to be electrically insulated from the other windings 26 arranged in the same slot 4 and from the tooth 3 (FIG. 2). In particular, one single sheet 29 is provided for each half-slot 4*a*.

Figures 6, 7:
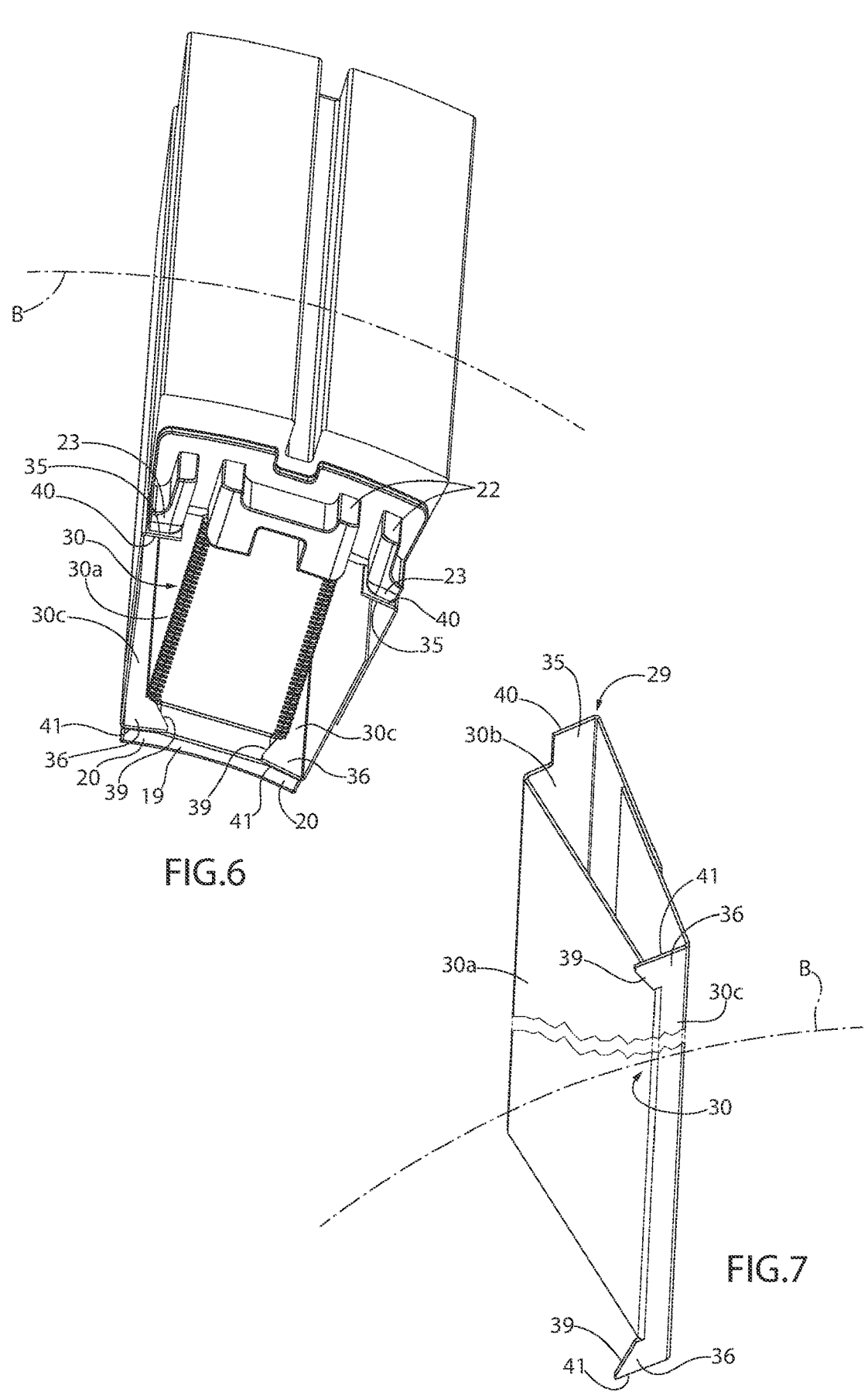
FIGS. 6 and 7 show, on a larger scale and from different points of view, two details of the detail of FIGS. 3-5.

With reference to FIG. 7, the sheet 29 comprises a C-shaped portion, which is indicated by reference number 30, faces the side surface of the half-slot 4*a* with the same profile as said side surface and insulates the wire portions 26*a* from the tooth 3. In particular, the portion 30 consists of a intermediate strip 30*a* arranged in front of the face 9*a* (along the direction B) and of two strips 30*b* and 30*c*, which define respective folding lines with the strip 30*a* and are arranged in front of the faces 9*b* and 9*b*, respectively (in a radial direction).

According to the invention, the attachment portion 16 of the cap 14 is interposed between the end 3*a* of the tooth 3 and the portions 30 of the sheets 29. In other words, the sheet 29 rests on the outer surface of the cap 14 and, hence, is not locked or clamped between the latter and the tooth 3. Therefore, before forming the windings 26, the portion 30 of the sheet 29 is spaced apart from the side surface of the half-slot 4*a*.

In particular, the intermediate rib 18*a* of each connecting wall 18 remains arranged between the face 9*a* of the tooth 3 and the intermediate strip 30*a* of the corresponding sheet 29; and the flanges 18*b* and 18*a* of the wall 18 remain arranged between the faces 9*b* and 9*c* of the tooth 3 and the strips 30*b* and 30*c* of the sheet 29. In other words, the strip 30*b* of the sheet 29 rests on the face 24, whereas the strip 30*c* rests on the face 21.

According to a preferred aspect of the invention, the sheet 29 comprises two pairs of flaps, indicated by 35 and 36, which longitudinally project from the portion 30 out of the corresponding half-slots 4*a*, past the covering portions 17, and radially rest on the side portions 23 and 20 defining the opposite ends of the appendages 22 and of the plate 19 (FIG. 6).

In particular, the flaps 36 and 35 define the longitudinal extensions of the strips 30*c* and 30*b* of the sheet 29 and longitudinally project past the intermediate strip 30*a* (FIG. 7).

As shown in FIG. 6, the flaps 36 and 35 have a length that is such as to cover the entire longitudinal width of the corresponding side portion 20, 23. In other words, in particular, the flaps 35 and 36 can longitudinally end with respective edges 40, 41, which are flush with the end edges of the plate 19 and of the appendages 22.

Both longitudinal ends of each sheet 29 are preferably provided with the flaps 35 and/or 36.

According to the embodiment shown herein, each flap 36 has a width (along the direction B) which progressively widens moving away from the corresponding half-slot 4*a* in a longitudinal direction. Specifically, the edge 39 of the flap 36 diverges towards a radial symmetry plane of the tooth 3 (instead of being parallel to the tooth 3). In particular, the flaps 36 substantially have the shape of a right trapezoid, if they are observed in a radial direction.

Figure 3:
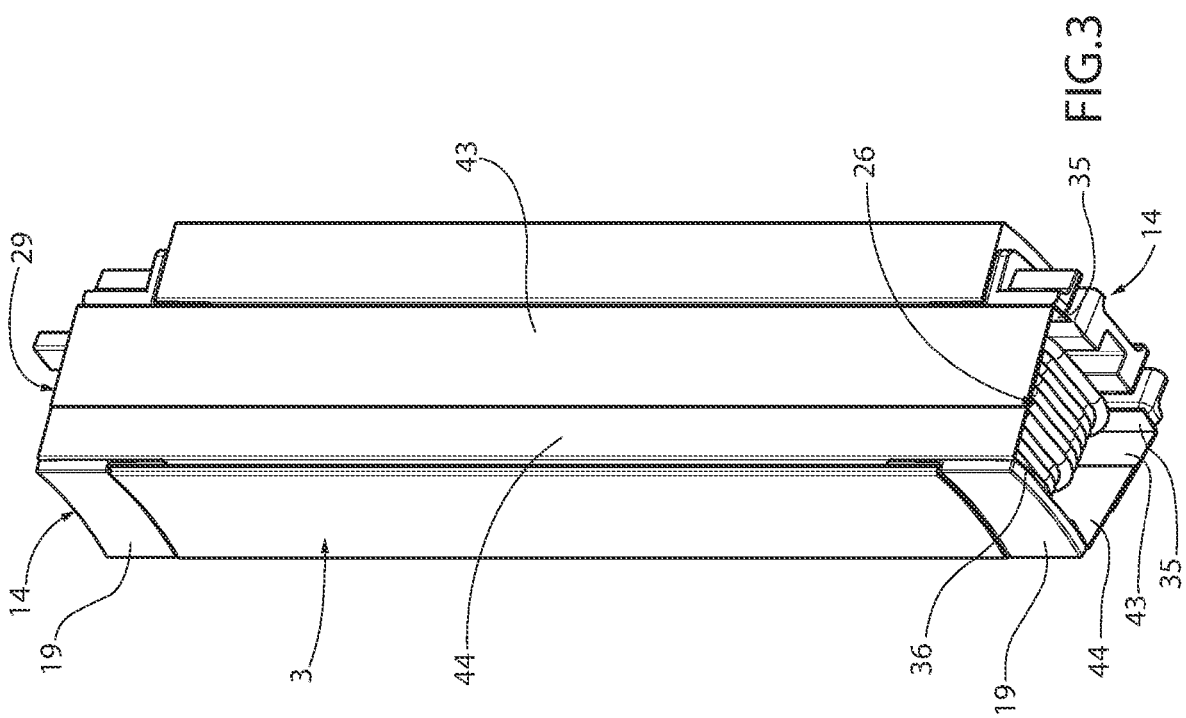
FIG. 3 shows, from a different point of view, a detail of the stator of FIG. 1.

With reference to FIGS. 3 and 7, each sheet 29 comprises two wings 43 and 44, which extend radially and overlap one another at their ends. The wings 43 and 44 basically divide the space of a slot 4 into the two half-slots 4*a* and rest, along the direction B, against the wings 43, 44 of the sheet 29 engaging the adjacent half-slot 4*a* (FIG. 2). It is evident that the wings 43, 44 are folded relative to the portion 30; each one of them conveniently defines a folding line not only with the portion 30, but also with the flaps 35 and/or 36. In other words, the wings 43 and 44 have a length that is equal to the sum of the lengths of the flaps 35, 36 and of the strips 30*b*, 30*c*. Thanks to this greater length of the wings 43 and 44, the flaps 35 and 36 have a high stiffness or shape stability during the cable winding operations to be performed to obtain the windings 26.

Owing to the above, it is evident that the caps 14 and the sheets 29 can be positioned and/or fixed relative to the teeth 3 in a relatively simple manner, since the caps 14 are directly coupled to the surface of the half-slots 4a through interference and without the interposition of the sheets 29. They are laid on the outer surface of the caps 14 (namely, on the faces 21, 24 and 25) only after the caps 14 have been fixed to the corresponding ends 3a of the tooth 3.

In particular, the operations to fix the caps 14 to the ends 3a of the teeth 3 can be carried out without particular attention or care, for example in a manual manner, since they do not involve the positioning and the fixing of the sheets 29. The operations performed to introduce and position the sheets 29 in the respective half-slots 4a, indeed, are carried out only after having ended the positioning and the fixing of the caps 14, preferably in an automated manner.

Furthermore, operators have to perform relatively simple operations in order to hold the sheets 29 on the caps 14 in a fixed position during the wire winding operations to form the windings 26 after having positioned the portions 30 of the sheets 29 in the respective half-slots 4a (with the wings 43 and 44 stretched out in an open position); to this regard, during said winding, the edges 40 and 41 (at the longitudinal ends of the flaps 35 and 36) and/or the longitudinal edges of the wings 43 and/or 44 can be used as aids to hold the sheet 29 still in a longitudinal direction, for example between two abutments (not shown) arranged on opposite axial sides of the tooth 3; or suitable retaining systems can be used, for example clamps, which hold the paper still during the winding, exploiting the wings 43 and 44, which have to be held open.

This easiness and precision in holding the sheets 29 still during the winding of the wires also increase the winding speed and, hence, reduce the production times of the stator 1.

After the winding of the wires around each tooth 3 and the relative caps 14, the sheets 29 are fixed relative to the teeth 3, thanks to the windings 26 themselves; at this point, the wings 43 and 44 are folded to the position shown in FIG. 3, using known techniques, so as to insulate the wire portions 26a arranged in each half-slot 4a. Finally, the teeth 3—with their sheets 29 and their windings 26—are pushed closer along the direction B so as to assemble the stator 1 using known techniques.

The fact of coupling the caps 14 to the ends 3a of the teeth 3 without interposing any part of the sheets 29 also allows manufacturers to design and produce the caps 14 with slightly smaller dimensions. Indeed, the plastic material of the attachment portions 16 is directly coupled to the iron of the tooth 3 through interference, so that this coupling is stiffer and more precise compared to known solutions. Thanks to this precision, the caps 14 can be designed with smaller tolerances (for example, with a centesimal precision), thus further reducing the thickness of the two connecting walls 18. This space saving can advantageously be used to increase the volume of the conductive material of the windings 26 in the half-slots 4a, with a consequent increase in the efficiency of the electric machine.

A further space saving, to the advantage of the volume available in the half-slots 4a for the windings 26, is obtained with the variant of FIG. 8, wherein the connecting walls 18 are recessed and, hence, do not project relative to the faces 9a, 9b and 9c. Furthermore, this solution improves the positioning of the sheets 29, since they rest on flat surfaces (in the solution of FIG. 5, on the contrary, the sheets 29 tend to form a curve at the step or level difference defined by the connecting wall 18 relative to the faces 9a, 9b and 9c).

Finally, owing to the above, the stator 1 described above with reference to the accompanying drawings could evidently be subjected to changes and variants, though without going beyond the scope of protection defined in the appended claims.

In particular, the specific shape of the side surface of the slots 4 and/or the shape and size of the caps 14 and/or the shape and number of insulation sheets inside each slot 4 and/or the number of flaps 35 and 36, etc. could be different from the ones discussed above by mere way of example.

The invention claimed is:

1. An electric machine stator, comprising a core of ferromagnetic material, consisting of a plurality of teeth arranged around a longitudinal axis and defining a plurality of slots between them, along a circumferential direction; the stator comprising, for each tooth:
    two half-slots, on opposite sides of the tooth along said circumferential direction;
    two insulating elements, each comprising
    a) a covering portion longitudinally resting against a corresponding longitudinal end of said tooth, and
    b) an attachment portion, which is made of a plastic material and is coupled to said longitudinal end in a fixed position;
    for each half-slot, a respective sheet of foldable insulating material comprising a C-shaped portion housed in the corresponding half-slot;
    at least one winding, which is made of an electrically conductive material, is wound around said C-shaped portions and around said insulating elements and comprises:
    c) first wire portions arranged in said half-slots, and
    d) second wire portions arranged around said insulating elements;
    wherein each attachment portion is directly coupled to the corresponding longitudinal end of the tooth, without interposition of any part of said sheets,
    wherein, at said half-slots, said longitudinal ends have side surfaces with recesses, and
    wherein said attachment portions engage said recesses.

2. The stator according to claim 1, wherein said attachment portion is interposed between said C-shaped portions and the longitudinal end of the tooth.

3. The stator according to claim 2, wherein said C-shaped portion directly rests on said attachment portion.

4. The stator according to claim 1, wherein each attachment portion consists of two connecting walls, which longitudinally project from said covering portion into respective half-slots and are arranged on opposite sides of the corresponding tooth along said circumferential direction.

5. The stator according to claim 4, wherein said connecting walls are shaped with the same C-shaped profile as the surface of said half-slots.

6. The stator according to claim 4, wherein each connecting wall consist of an intermediate rib and of two wings, which project from respective edges of said intermediate rib.

7. The stator according to claim 1, wherein said attachment portions are enclosed in said recesses.

8. The stator according to claim 7, wherein each attachment portion is flush with the surface of said half-slots.

9. The stator according to claim 3, wherein each insulating element further comprises at least one front projection projecting from said covering portion as a longitudinal extension of a wing of said attachment portion;

and wherein each sheet comprises at least one flap, which longitudinally projects from a portion of said C-shaped portion and is radially arranged on said front projection.

10. The stator according to claim 9, wherein said flap has a length that is such as to cover the entire longitudinal width of said front projection.

11. The stator according to claim 9, wherein the C-shaped portion of each sheet comprises:

an intermediate strip arranged in front of a face of the corresponding half-slot, along said circumferential direction, and two strips, which define respective folding lines with said intermediate strip and are arranged, in a radial direction, in front of respective further faces of the corresponding half-slot; said flap defining a longitudinal extension of one of said two strips.

12. The stator according to claim 9, wherein each sheet is provided with said flap at its opposite longitudinal ends.

13. The stator according to claim 9, wherein each sheet further comprises at least one foldable wing, which separates windings arranged in the same slot and defines a folding line with said C-shaped portion and said flap.

* * * * *